US007969909B2

(12) United States Patent
Oerton

(10) Patent No.: US 7,969,909 B2
(45) Date of Patent: Jun. 28, 2011

(54) SYSTEM AND METHOD FOR SEEKING A WIRELESS NETWORK FOR A WIRELESS DEVICE

(75) Inventor: Kevin Oerton, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1197 days.

(21) Appl. No.: 11/624,262

(22) Filed: Jan. 18, 2007

(65) Prior Publication Data
US 2008/0175166 A1 Jul. 24, 2008

(51) Int. Cl.
*H04L 12/28* (2006.01)

(52) U.S. Cl. .......... 370/254; 370/338; 370/340; 379/80; 455/3.06; 455/434; 455/456.1

(58) Field of Classification Search .................. 370/252, 370/254, 331, 338, 340; 379/80; 455/456.1, 455/3.06, 434; 607/60; 701/33; 709/217, 709/220
See application file for complete search history.

(56) References Cited

U.S. PATENT DOCUMENTS

| 7,010,310 | B2 | | 3/2006 | Chen | |
|---|---|---|---|---|---|
| 7,093,015 | B2 | * | 8/2006 | Gubbi et al. .................. | 709/225 |
| 7,408,907 | B2 | * | 8/2008 | Diener .......................... | 370/338 |
| 7,489,992 | B2 | * | 2/2009 | Valette et al. .................. | 701/33 |
| 7,672,248 | B2 | * | 3/2010 | Morris .......................... | 370/252 |
| 7,701,904 | B2 | * | 4/2010 | Lee et al. ....................... | 370/331 |
| 7,769,342 | B2 | * | 8/2010 | Tabe ............................. | 455/3.06 |
| 2003/0014497 | A1 | * | 1/2003 | Pathak et al. .................. | 709/217 |
| 2003/0021250 | A1 | * | 1/2003 | Willins et al. ................. | 370/338 |
| 2003/0041125 | A1 | * | 2/2003 | Salomon ........................ | 709/220 |
| 2004/0203897 | A1 | * | 10/2004 | Rogers ......................... | 455/456.1 |
| 2005/0138178 | A1 | | 6/2005 | Astarabadi | |
| 2005/0197136 | A1 | * | 9/2005 | Friday et al. ................ | 455/456.1 |
| 2007/0135866 | A1 | * | 6/2007 | Baker et al. .................... | 607/60 |
| 2007/0191005 | A1 | * | 8/2007 | Cooper et al. ................. | 455/434 |
| 2007/0253395 | A1 | * | 11/2007 | Graves et al. ................. | 370/338 |
| 2008/0013463 | A1 | * | 1/2008 | Greel et al. .................... | 370/254 |
| 2008/0069065 | A1 | * | 3/2008 | Wu et al. ........................ | 370/340 |
| 2008/0175166 | A1 | * | 7/2008 | Oerton ........................... | 370/254 |
| 2009/0213752 | A1 | * | 8/2009 | Butti et al. ..................... | 370/254 |

FOREIGN PATENT DOCUMENTS

| EP | 0605989 | 7/1994 |
|---|---|---|
| WO | WO 02/93955 A1 | 11/2002 |
| WO | WO 2006/100653 A2 | 9/2006 |

OTHER PUBLICATIONS

Wireless Local Area Networks and the 802.11 Standard; Mar. 31, 2001; PLAMEN NEDELTCHEV, PhD.

* cited by examiner

*Primary Examiner* — Gerald Gauthier
(74) *Attorney, Agent, or Firm* — McCarthy Tétrault LLP

(57) ABSTRACT

The invention relates to a system and method for initiating a command relating to one network that an electronic communication device may be in communication with, depending on triggering conditions relating to another network that the device may be in communication with. In the method, the device initiates a command relating to a network for a communication device only after satisfaction of a predetermined condition relating to another network. The network may be a 802.11*a* network; the another network may be a non-802.11*a* network; the predetermined condition may be detection of a connection to the non-802.11*a* network; and the command may be to initiate monitoring for a connection to the 802.11*a* network.

18 Claims, 4 Drawing Sheets

SYSTEM AND METHOD FOR SEEKING A WIRELESS NETWORK FOR A WIRELESS DEVICE

The invention described herein relates to a system and method for seeking a wireless network connection for a wireless device. In particular, the system and method may be used to seek and/or search for a connection to an IEEE 802.11x-compliant network.

BACKGROUND

Wireless handheld mobile communication devices perform a variety of functions to enable mobile users to stay organized and in contact with others in a communication network through e-mail, schedulers and address books.

As wireless devices are portable, they connect and communicate with several different wireless communication networks as they roam about the land. As a wireless device roams, it periodically scans to determine if it is in communication range of one of the target networks. Such scans expend power on the device, thereby depleting its battery. Also, scans may be initiated in a rote, automatic manner, thereby occasionally initiating unnecessary scans for certain network deployments. For example, there may be a situation where a wireless network is provided at a given location only if certain other parameters are provided.

There is a need for a system and method which addresses deficiencies in the prior art.

BRIEF DESCRIPTION OF THE DRAWINGS

Embodiments of the invention will now be described, by way of example only, with reference to the accompanying drawings, in which.

DETAILED DESCRIPTION OF AN EMBODIMENT

Figure 1:
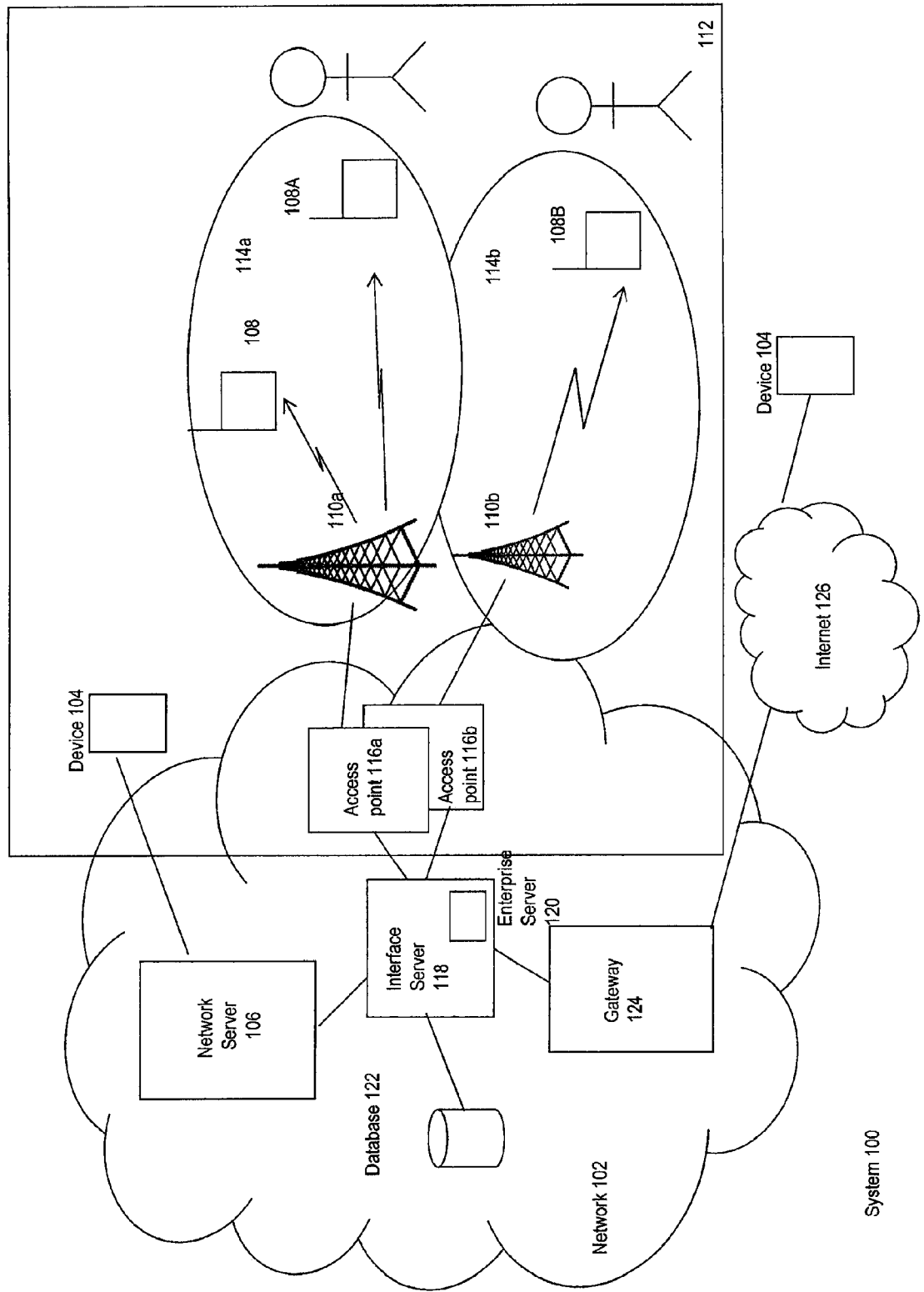
FIG. 1 is a schematic diagram of a communication network having a plurality of wireless networks therein that can communicate with a wireless device as provided in an embodiment.

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect, a method for initiating a command relating to a network for a communication device is provided. The method comprises initiating a command relating to the network after satisfaction of a predetermined condition relating to another network.

In the method, the network may be a 802.11a network; another network may be a non-802.11a network; the predetermined condition may be detection of a connection to the non-802.11a network; and the command may be to initiate monitoring for a connection to the 802.11a network.

In the method, initiating the command to the network may comprise monitoring for receipt of a beacon signal from the network. Further, the non-802.11a network may be selected from at least one of the following networks: a 802.11b network; a 802.11g network, a 802.11b/g network and a 802.11n network.

Additionally, the predetermined condition may further comprise at least one of the following conditions: a time tracked by the device; a present location of the device; and a signal strength detected by the device for the another network having a minimum predetermined strength.

Additionally, after the connection is established, the connection may be terminated after satisfaction of a second predetermined condition. The second predetermined condition may comprise at least one of the following conditions: an elapsed time of searching for the network; a present location of the device; and the signal strength of communications from the non-802.11a network dropping below a predetermined threshold.

In the method, the network may be one type of 802.11 network and the another network may be another type of 802.11 network different from the type of the first network.

In a second aspect, a system for initiating a command relating to a network for a communication device is provided. The system comprises: a monitoring process for monitoring for connection signals from a plurality of networks for the device; an evaluation process to evaluate the connection signals and determine whether a trigger condition for a command relating to one of the networks has been satisfied; and a command process to initiate the command for the network. In the system, the evaluation process causes the command process to initiate the command for the network upon detecting satisfaction of the predetermined condition from connection signals from the monitoring process.

In the system, each network may be of the same type. Alternatively, in the system, there may be a first network of a first type and a second network of a second type.

In the system, the network may be a 802.11a network; the command may be a request to monitor for a connection to the 802.11a network; and the predetermined condition may comprise detection of a connection to a non-802.11a network by the monitoring process.

In the system, the monitoring process may monitor for receipt of beacon signals from the networks.

The system may further comprise a GUI process providing an interface on the device to change the predetermined condition. The condition could also be set in the UI of a separate server and subsequently downloaded to the device.

In the system, the predetermined condition may further comprise at least one condition selected from the following conditions: a time tracked by the device; a present location of the device; and a signal strength detected by the device for the connection to the non-802.11a network having a minimum predetermined strength.

In the system, after the connection is established, the evaluation process may monitor for a second predetermined condition and upon satisfaction of the second predetermined condition, the system may initiate a command to terminated the connection.

In the system, the second predetermined condition may comprise at least one of the following conditions: an elapsed time of searching for the network; a present location of the device; and the signal strength of communications from the another network dropping below a predetermined threshold.

In other aspects, various combinations of sets and subsets of the above aspects are provided.

Exemplary details of embodiments are provided herein. Briefly an embodiment provides a method and system to initiate a command for a wireless network for a device, such as to seek a connection to the network. When seeking a network, instead of simply polling for a network (such as polling for a beacon signal for the network), an embodiment relies on other characteristics, parameters or information to determine when to search and/or seek for specific classes of networks. In one embodiment, the connection is sought after another network is found. First, a description is provided on general concepts and features of an embodiment and its related network and network-seeking and detection algorithms. Then, further detail is provided on an exemplary wireless device related to an embodiment.

To begin, details on an exemplary network and its communicating device for an embodiment are provided. FIG. 1 shows communication system 100 where network 102 provides a suite of applications, services and data to its connected devices 104 through its associated servers. Devices 104 connect to network 102 through wired connections to network server 106 which has software and hardware facilities to manage all communications of data and messages among devices communicating in network 102. Network 102 can be implemented in any known architecture, providing wired or wireless connections to its elements.

Wireless devices 108 communicate with each other through wireless networks 110. In many environments, networks 110 are local, geographically small, wireless networks (such as wireless local area networks or WLANs), perhaps being contained within a single building 112. Wireless devices 108 include handheld devices, cell phones and computers (either desktop or portable) having a (wireless) network card, network adapter and/or network interface controller (NIC) installed therein. There may be one or more networks 110 at a particular site and the geographic coverage 114 of each network 110 may overlap fully, partially or not at all.

Additional networks 110 may be located in a second geographic area (not shown). For example, building 112 may be located in Waterloo, Ontario while the second geographic location may be located Mississauga, Ontario. While located in the vicinity of building 112, a wireless device 108 is able to communicate through one or more of the first group of WLANs 110. Similarly, while located in the vicinity of the second geographic location, that wireless device 108 would be able to communicate through one or more of the second group of WLANs. While travelling between the first and second geographic locations, a wireless device 108 may be able to communicate through one or more of each of the first and second groups of WLANs depending on available signal strength, transmitted power, etc. If WLAN networks are not available between first and second groups, then device can use wide-area wireless networks if available.

Each network 110 includes an antenna, access point (AP) 116 and supporting radio transmission equipment known to those skilled in the art. In an embodiment, each access point 116 is an IEEE 802.11 radio receiver/transmitter (or transceiver) and functions as a bridge between its respective WLAN 110 and network 102. For security, each access point 116 may be communicatively coupled to network 102 through a respective firewall and/or VPN (not shown). It provides data distribution services among devices 108 within network 110 and between devices 108 in network 110 and other devices in other connected networks. One distribution service provided by access point 108 for its related stations is to establish a logical connection between a device 108 and an access point.

Interface server 118 in network 102 provides hardware and software systems to allow network 102 to communicate with wireless networks 110. For communications directed to wireless devices 108, wireless services enterprise server 120 provides an interface with server 106 for transmissions destined to devices 108 and vice versa.

Database 122 provides a data storage system for one or more elements in network 102, including server 106. Security systems within network 102 can be provided by known techniques and systems. Gateway 124 provides and monitors selected communications between elements in network 102 and external devices connected through Internet 126.

Some further detail is provided on an exemplary installation for networks 110A and 110B relating to an embodiment. Networks 110A and 110B are implemented as Wireless Fidelity (Wi-Fi) networks generally following standards set by the IEEE LAN/MAN Standards Committee, known as IEEE 802, through its working group "11". The 802.11 standard defines media access control (MAC) and physical (PHY) layers in the Open Systems Interconnection (OSI) protocol model for WLAN. Such standards are known to those of skill in the art. Administrative functions for networks 110 may be provided by software controlling them. The software may administer functions such as network identification and network access parameters.

The initial 802.11 standard was followed with a series of amendments, where each amendment was identified by an alphabetic suffix following in the standard's numeric identifier "802.11". The family of 802.11 amendments is sometimes referred to as the 802.11x family. Currently, the 802.11 amendments encompass six wireless modulation techniques that all use the same communication protocol among their communicating elements. Wireless transmission for networks following the 802.11b and 802.11g amendments transmit communications in the 2.4 GHz frequency band. Networks following the 802.11a amendment transmit communications in the 5 GHz band. The 802.11b amendment was the first widely accepted wireless networking standard. Selected 802.11 amendments and terms are briefly discussed below.

The 802.11b amendment has a maximum raw data rate of 11 Mbit/s and uses a media access method defined in the original 802.11 standard. The 802.11b amendment uses Complementary Code Keying (CCK) to modulate its data. In field use, the typical maximum throughput is about 5.9 Mbit/s when data is transmitted using transmission control protocol (TCP) and 7.1 Mbit/s when using user datagram protocol (UDP). A 802.11b network is typically deployed as a point-to-multipoint configuration, wherein an access point 116 communicates via an omni-directional antenna with devices 108 in the transmission range of the access point. A typical indoor communication range is 30 m at 11 Mbit/s between devices 108 and the access point 116 and 90 m at 1 Mbit/s.

The 802.11g amendment provides a maximum raw data rate of 54 Mbit/s. Generally, devices 108 having 802.11g-compliant hardware can also communicate in 802.11b networks. Data can be modulated in a 802.11g network using one of several techniques, depending on the transmission rate, including: orthogonal frequency-division multiplexing (OFDM), CCK and Differential Binary Phase Shift Keying/Differential Quadrature Phase Shift Keying with Direct Sequence Spread Spectrum (DBPSK/DQPSK+DSSS). It has been observed that the maximum transmission range of 802.11g devices is slightly greater than that of 802.11b devices, but that the range that devices can achieve a full data rate which may be smaller than the rate of a 802.11b network. For North American transmissions, both the 802.11b/g protocols define 7 transmission channels. However, the full complement of channels, covering all world-wide regions, is 14 channels between 2.412 GHz and 2.484 GHz, where each channel is 22 MHz wide.

The 802.11a amendment modulates its transmissions using OFDM, providing a maximum raw data rate of 54 Mbit/s. The data rate is reduced in a step-wise fashion, as needed. For North American transmissions, the 802.11a amendment defines 12 non-overlapping channels, where eight (8) channels are dedicated to indoor deployments and four (4) channels are dedicated to point-to-point networks. However, the full complement of channels, covering all world-wide regions, is 27 channels between 5.107 GHz and 5.805 GHz, where each channel is 20 MHz wide.

The 802.11n amendment was announced in 2004 and its real data throughput is estimated to be up to 540 Mbit/s. Projected speeds may be up to 50 times faster than transmissions in 802.11b and over 10 times faster than transmissions in 802.11a or 802.11g.

For a 802.11 network, a "station" is a basic component in the network. A station is any device that implements the functionality of a 802.11 protocol and has a connection to the wireless network. Typically, the 802.11 connection and communication functions are implemented in hardware and software and may be provided in a network connection circuit or system in a network interface card (NIC) at the station. A station may be any device, including a laptop computer, handheld device 108, or an access point 116. Stations may be mobile, portable, or stationary. All stations support the 802.11 station services of authentication, de-authentication, privacy, and data delivery. For the purposes of an embodiment as it relates to 802.11 standards, devices 108 may be considered to be stations.

An Independent Basic Service Set ("IBSS") is a set defining a series of stations that communicate with an access point. The access point operates as a local relay for the stations. All stations communicate with the access point and preferably do not communicate with each other directly. All frames are relayed among the stations through the access point. The access point may also provide connection to a distribution system. For the purposes of an embodiment as it relates to 802.11 standards, each network 110 may be considered to be an IBSS. Other connection interfaces may be provided for a network, such as a direct link set-up or an ad-hoc set-up.

A service set identifier ("SSID") is a unique 32-character network name, or identifier, that is created and associated with a particular WLAN 110. The SSID can be any alphanumeric entry up to a maximum of 32 characters and is typically case sensitive. It may be set by a network administrator using network administration software for a control server of WLAN 110. The SSID should be chosen so that it differentiates one WLAN from another. As the SSID differentiates one WLAN from another, any APs and all wireless and other devices attempting to connect to a specific WLAN may require that a device provides the correct SSID for that WLAN before permitted the device to join that WLAN.

Further detail is now provided on messages generated and sent between components in WLAN 110. In a 802.11-compliant network, messages are sent between its AP 116 and its communicating devices 100 in data transmissions called frames. Frames are sent and processed in a "send-and-respond" protocol. As such a frame may be broadcast by an AP 116 to one or more devices 108. When a device receives a frame, it extracts data from the frame and then it may generate a response. A similar communication dialog may be initiated by a device 108 to AP 116. There are several classes of frames including control, management and data. Control frames assist in delivering data frames between stations. Management frames facilitate connection establishment and maintenance between a device 108 and AP 116. In particular management frames are used: to allow a device be associated, disassociated and re-associated to a network; to allow a device to be authenticated with a network; and to allow a device to initiate a probe request to an AP to request information about another device in a network. Frames may include additional information such as source and destination MAC addresses, a control field that provides information on the 802.11 protocol version, frame type and other status indicators. It will be appreciated that a person of skill in the art has knowledge of the protocols of the frames. Additional materials relating to same are provided in published 802.11 Working Group materials.

A beacon frame is a type of a management frame that is periodically broadcast by an AP 116 (e.g. every 100 ms) to provide a signal of its presence to the communication boundaries of its network. The body of a beacon frame contains: a beacon interval, providing the amount of time between beacon transmissions; a timestamp, which may be used by a station to synchronize itself and update its local clock; and the SSID of the WLAN 104 of the AP 116. The beacon frame can also provide: data indicating the supported transmission rates of the WLAN; data regarding the signalling parameters of the WLAN, such as frequency hopping spread spectrum, direct sequence spread spectrum, etc.; data on the capabilities of the WLAN; and data providing a traffic indication map (TIM). The beacon frame includes a frame header and cyclic redundancy checking (CRC) field. The destination address of the frame is set to all 1's, which is the broadcast MAC address. This will cause all other stations on the applicable channel to process a received beacon frame. Other embodiments may selectively broadcast a beacon or may vary the broadcast transmission parameters upon satisfaction of preset conditions.

Devices 108 and their NICs may continually scan some or all 802.11 radio channels and listen for beacons. There may be a filter to listen or not listen for specific beacons. If multiple beacons are received from multiple APs, then device 108 may evaluate the parameters of the underlying networks to identify a most suitable network. Thereafter, the device would then attempt to establish communications to that network through the selected AP.

As noted above, before a station can be associated with a WLAN, it may need to obtain the SSID of the access point. Generally, a network identification sniffing functions (such as that provided by Windows XP) is provided on device 108 to allow the device to process the network information in a received beacon signal. Such functions can extract the SSID data to configure device 108 and its associated NIC with the proper SSID for that WLAN.

Further detail is now provided on how a device 108 interacts with access point 116 when entering the coverage area of network 110. Each device 108 that enters a coverage area 114 needs to become associated with the related access point 116 before a communication connection is made to network 110. Once an association is made, access point 116 is able to use identification data relating to device 108 to determine where and how to deliver data to that device 108.

Device 108 associates with a WLAN as follows. As a device 108 roams into the coverage area 114, it periodically scans for any beacon signals on some or all channels on one or more classes of 802.11 network(s). When a beacon is found, the device extracts data parameters of particular network. If device 108 is receiving multiple beacon signals because multiple coverage areas 114 overlap at the particular location of device 108, then device 108 may go through an arbitration process to determine which beacon signal(s) to respond to. This enables a ranking of access points based on the received signal strength of the beacon or other parameters, such as capability information of the network. The NIC may then generate and send an association frame to its most preferred AP to attempt to associate with that AP.

After making a successful association, a station may continue to scan for other beacons in case the signal from the currently-associated access point become too weak to maintain communications. Generally, device 108 invokes the association service only once, typically when it enters a coverage area 114. Each device 108 can be associated with only one access point, but an access point 116 may be associated with multiple devices 108.

Many devices and access points following the 802.11 standard can communicate with 802.11a, b and g networks. For example Cisco Systems Inc. offers its Aironet 1130AG Series (trade-mark) of access points that provide 802.11a/b/g communication capabilities in one box. As such, for those access points, the transmission region for their 802.11a network may largely overlap with the region for their 802.11b/g network.

For a particular network, when device 108 is seeking a 802.11a network, this may involve scanning up to 27 channels. A prior art network-seeking algorithm would normally periodically and automatically scan for beacon signals for a 802.11a network. This approach may be wasteful. Based in part on the deployment of access points providing multiple 802.11 network capabilities, to take advantage of possible transmission overlap for a 802.11a network, an embodiment utilizes a different network-seeking algorithm. Therein, the algorithm conditionally seeks for a network. The search for a network (e.g. by searching for a 802.11a beacon signal), may be initiated only after a beacon signal for a 802.11b/g network is detected. For other networks, it will be appreciated that a matrix of algorithms can be provided for other embodiments where a particular 802.11 network initiates its network-seeking algorithm, based at least in part, on the detection of another 802.11 network. It is also feasible, subject to any network connection restrictions to seek another connection to another network of the same type once a connection is detected. For example, if a connection is detected for a 802.11a network, then that may be a trigger condition for seeking another connection to another 802.11a network. In this case, the other network may be scanned on different channels than the detected 802.11a network.

Additionally or alternatively, an algorithm may be provided that seeks other networks only after other trigger conditions are satisfied. The execution and monitoring of the results of the algorithm may be implemented in an evaluation process operating on device 108. The evaluation process may be implemented in one or more modules in device 108. For example, conditions may incorporate one or more of the following parameters: detection of a certain network, non-detection of a certain network, detection of minimum signal from a certain network, time parameters, and geographic location of the device. Also, searches for other non-802.11 networks may be initiated after the detection of a 802.11 network (or vice versa). Table A provides an exemplary set of trigger conditions that may be implemented when initiating a particular command relating to a particular network.

TABLE A

| Command | First trigger condition | Qualifier | $2^{nd}$ Trig. condition | Qualifier | $3^{rd}$ Trig. condition | Stop Condition |
|---|---|---|---|---|---|---|
| Seek a 802.11a network | Detection of a 802.11b and/or 802.11g network(s) | and | It is after 10:00 a.m. (EST) | and | Current location of the device is in 416 area code | 2 minutes after initiating a seek |
| Seek a 802.11b network | Dropping of a 802.11n network | and | It is before 12:00 p.m. (PST) | or | Current location of the device is not in the 905 area code | Signal strength of the 802.11n network drops below a predetermined minimum |
| Terminate connection to a CDMA network | Detection of a Bluetooth | and | A 802.11b network has not been detected | | | |
| Send status command to Bluetooth network | Detection of 802.11a network | | | | | |

As noted earlier, it will be appreciated that the type of network sought under the "command" field, may be of the same or different type of any network in any trigger condition. It will be appreciated that the list of qualifiers and the list of networks to be scanned can be expanded to accommodate different sets of conditions as required by particular device 108. Also, any type of qualifier may be used, such as "AND", "OR", "NOT", etc. For example a geographic location of device 108 may be provided and determined by techniques and systems known in the art including: GPS; cellular country code data evaluation; specific cell location evaluation; Access Point country code evaluation; and or an RFID tag. The list of trigger conditions may be rearranged in different orders, expanded or contracted to meet specific network seeking conditions for other embodiments.

As noted in Table A, conditions may be provided as to when a seek for a network is to be terminated. As with the triggers to initiate a search, the conditions to terminate a search may further include one or more of the following parameters: detection of a certain network, non-detection of a certain network, detection of minimum signal from a certain network, time parameters, and geographic location of the device. The values of these parameters would likely be different than the values for parameters to initiate a search.

In other embodiments, the seek parameters of a network search algorithm may be controlled by an embodiment. For example, as a default network seeking state, a certain limited number of channels for a network may be scanned at a particular interval. However, upon satisfaction of the predetermined triggering conditions, the scanning frequency may increase (or decrease) and/or the number of channels scanned may increase (or decrease). Other variations on additional searching parameters may be provided, such as initiating searches on specific channels, when predetermined conditions are met.

Similarly, if a stop condition for a search algorithm is satisfied, then the search may be degraded, for example, by decreasing the scanning frequency or decreasing the number of channels scanned.

Although trigger conditions as described herein relate to initiating and terminating a network connection based on triggering conditions, in the alternative or in addition to such connection commands, other non-connection commands may be initiated upon satisfaction of the triggering conditions.

It will be appreciated that in a broad sense, an embodiment provides a method and system that initiates one activity or command for one type of networks only upon satisfaction of a condition relating to another network. Although some above embodiments are described in relation to connection and disconnection to a network, other embodiments may have a non-connection command sent to that network upon detection of a certain condition in another network.

Figure 2:
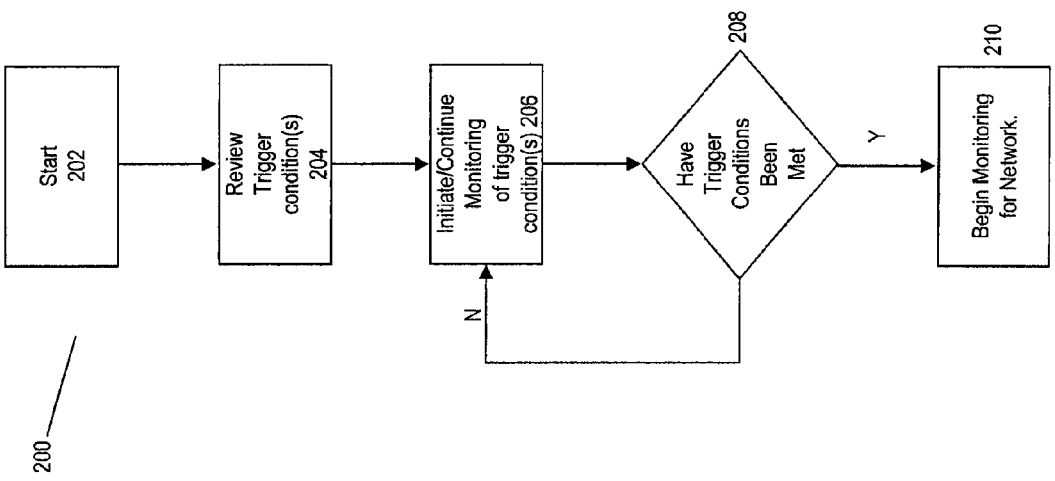
FIG. 2 is a flowchart of exemplary steps executed by the wireless device of FIG. 1 in determining an existence of a communication link to one or more wireless networks in accordance with an embodiment.

Referring to FIG. 2, flow chart 200 shows a process operating on device 108 used to determine when to seek a connection to a particular class or type of network. First at step 202, process 200 starts. At step 204, process 200 reviews any triggering parameters for network searches. Such parameters may be stored in a database accessible to device 108 and/or may be provided to device 108 from an outside source. Alternatively or additionally, such parameters may be set for a graphical user interface (GUI) operating on device 108. At step 206, monitors are activated for the trigger signals for the embodiments. At test 208, a check is made whether a trigger signal has been received. If no trigger signal has been received then process 200 returns to step 206. If a trigger signal has been received, then the process progresses to step 210 where a scan is initiated for the network. When the system is implemented in a 802.11 network, the monitoring of signals and the initiation of commands may follow the functional requirement of 802.11 frames as noted earlier.

It will be appreciated that other embodiments may have the elements of process 200 in different orders or may have more or less steps and tests therein. Process 200 may be atomized and may be executed by one or more evaluation, monitoring and command initiation processes operating on device 108. Also, process 200 may operate in the background on device 108.

To assist with management of these triggering arrangements, a software application referred to herein as a profile management module may be provided in device 108. Management of input and display of the profiles can be provided through a graphical user interface (GUI) that may be provided as part of that module. In the GUI, screen may be provided implementing selection and activation criteria for searching for networks (or other actions) based on triggering conditions provided from conditions relating to other networks as described herein. Once the conditions for the triggering conditions are entered, other processes and systems on device 108 may monitor for various conditions relating to the status of all networks conditions and connections that are monitored by device 108 and compares the conditions against the triggering conditions set in the profile management system. If a triggering condition is satisfied, the other processes can recognize this state and then proceed to implement any follow-up commands associated with the condition and update any relevant status indicators for the networks, monitoring process(es), triggering process(es) or any other relevant systems.

Device 108 can store in its database a list of profiles of wireless networks that have been access or can be accessed by the profile management module. For example, a profile can be provided for every SSID for a network or access point providing a saved group of network settings relating to the WLAN of the SSID. A SSID profile typically includes information such as the following: the SSID or WLAN name; a profile name (i.e., an optional alternate name for the WLAN other than the SSID); the operating mode (e.g., infrastructure, ad hoc, etc.); the standard type (e.g., 802.11a, 802.11b, 802.11g, etc.); and, security, encryption, and password settings (e.g., none, personal, enterprise, wired equivalency privacy ("WEP"), Wi-Fi protected access ("WPA"), etc.). Additional features such as any triggering conditions that need to be satisfied prior to initiating a beacon search (or other network detection search) for a target network may be provided. Profiles are typically displayed to a user in a profiles list on the wireless device's display screen and are typically arranged in order of network connection priority. A user may switch between WLANs by choosing a WLAN from the profiles list.

The profiles list may be populated by the wireless device upon performing a search or "scan" for available WLANs in the vicinity of the device. In this case, the profiles GUI will typically display available networks that broadcast their SSIDs and that are in range of the wireless device. The profiles list may also include networks for which a user has previously entered a SSID and any required profile settings. In addition, if a new network is detected or needs to be entered, the user may create new profiles for the profiles list through configuration input screens. If a new network is detected, some fields in the configuration screens may be pre-populated with data extracted from the connection information (such as the SSID, etc.). The list may or may not show profiles that do not have an active connection for the device.

Figure 3:
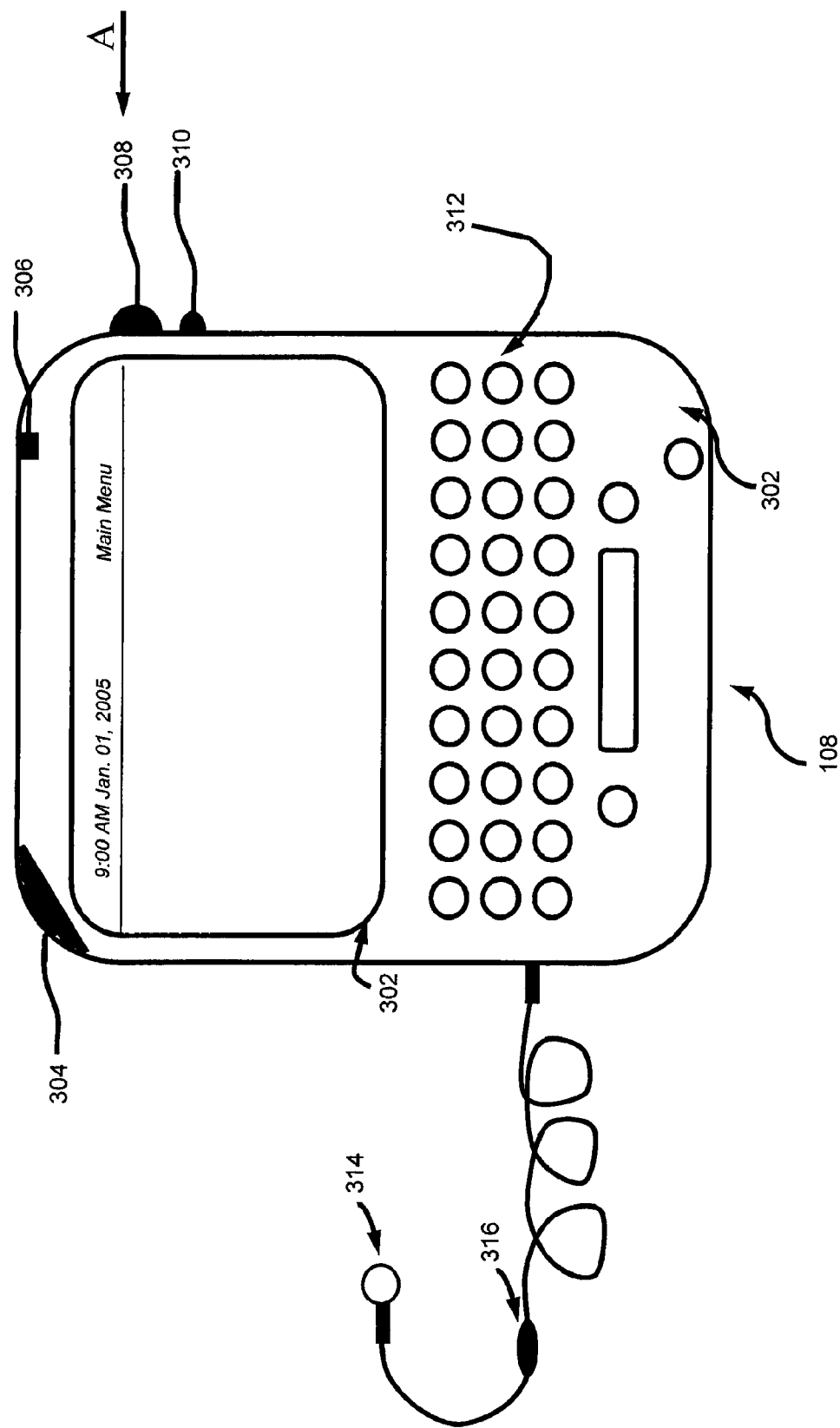
FIG. 3 is a schematic representation of the wireless electronic device in FIG. 1 in accordance with an embodiment.

FIG. 3 provides general features of an electronic device for receiving electronic communications in accordance with an embodiment of the invention, which is indicated generally at 108. In the present embodiment, electronic device 108 is based on a computing platform having functionality of an enhanced personal digital assistant with cellphone and e-mail features. It is, however, to be understood that electronic device 108 can be based on construction design and functionality of other electronic devices, such as smart telephones, desktop computers, pagers or laptops having telephony equipment. In a present embodiment, electronic device 108 includes a housing 300, an LCD 302, speaker 304, an LED indicator 306, a trackball 308, an ESC ("escape") key 310, keypad 312, a telephone headset comprised of an ear bud 314 and a microphone 316. Trackball 308 and ESC key 310 can be inwardly depressed along the path of arrow "A" as a means to provide additional input to device 108.

It will be understood that housing 300 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include the many forms of 802.11 wireless broadband, like 802.11a, 802.11b, 802.11g, etc. that support voice. Additionally, a Bluetooth network may be supported. Other embodiments include Voice over IP (VoIP) type streaming data communications that can simulate circuit-switched phone calls. Ear bud 314 can be used to listen to phone calls and other sound messages and microphone 316 can be used to speak into and input sound messages to device 108.

Figure 4:
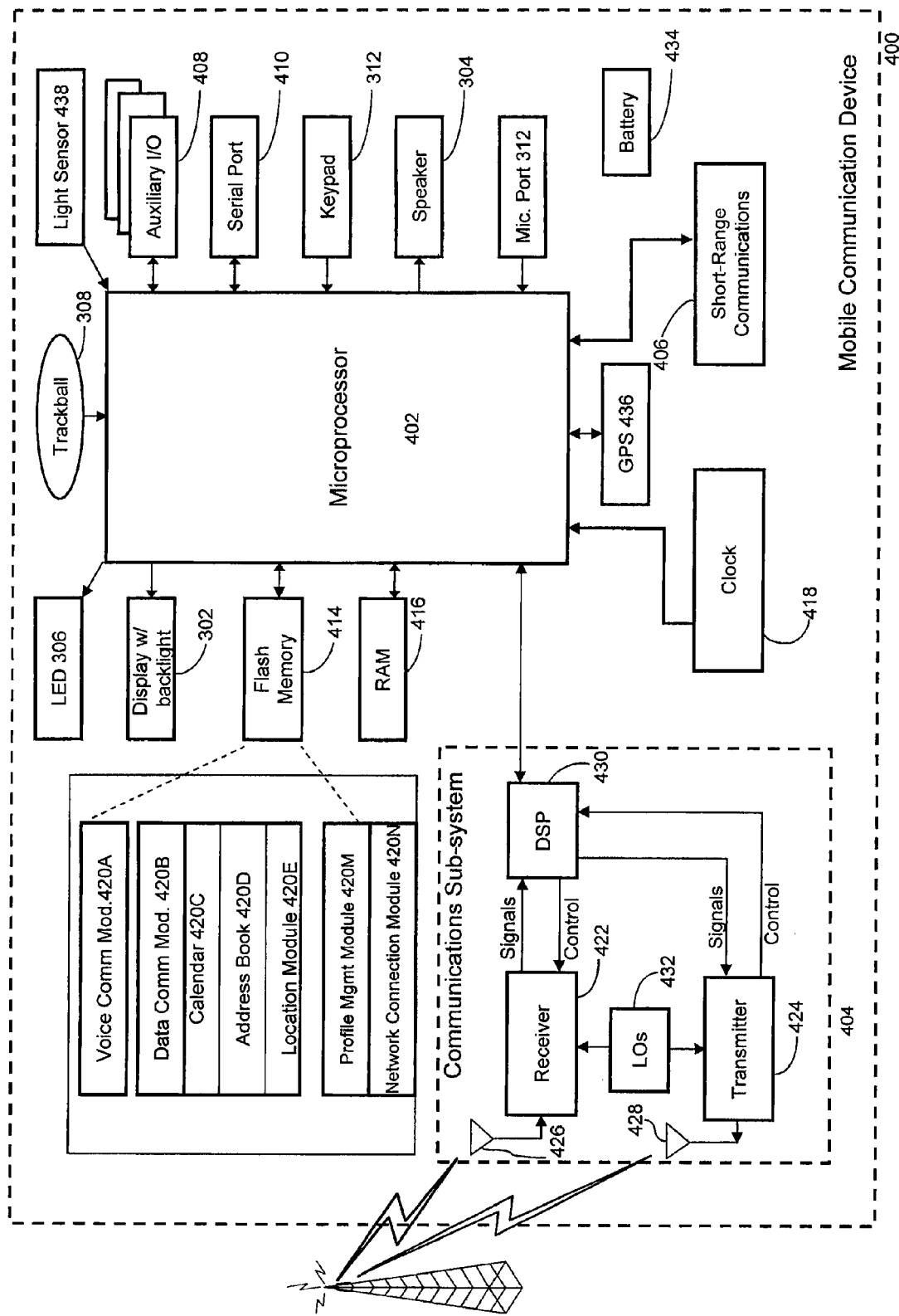
FIG. 4 is a block diagram of certain internal components of the device in FIG. 3.

Referring to FIG. 4, functional components of device 108 are provided in schematic 400. The functional components are generally electronic, structural or electro-mechanical devices. In particular, microprocessor 402 is provided to control and receive almost all data, transmissions, inputs and outputs related to device 108. Microprocessor 402 is shown schematically as coupled to keypad 312 and other internal devices. Microprocessor 402 preferably controls the overall operation of the device 108 and its components. Exemplary microprocessors for microprocessor 402 include Data 950 (trade-mark) series microprocessors and the 6200 series microprocessors, all available from Intel Corporation. Microprocessor 402 is connected to other elements in device 108 through a series of electrical connections to its various input and output pins. Microprocessor 402 has an IRQ input line which allows it to receive signals from various devices. Appropriate interrupt firmware is provided which receives and reacts to the signals detected on the IRQ line.

In addition to the microprocessor 402, other internal devices of the device 108 are shown schematically in FIG. 3. These include: display 302; speaker 304; keypad 312; communication sub-system 404; short-range communication sub-system 406; auxiliary I/O devices 408; serial port 410; microphone port 412 for microphone 316; flash memory 414 (which provides persistent storage of data); random access memory (RAM) 416; clock 418 and other device sub-systems (not shown). Device 108 is preferably a two-way radio frequency (RF) communication device having voice and data communication capabilities. In addition, device 108 preferably has the capability to communicate with other computer systems via the Internet.

Operating system software executed by the microprocessor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on device 108, additional software modules 420 enable execution of software applications on device 108. A set of software (or firmware) applications, generally identified as applications 420, that control basic device operations, such as voice communication module 420 and data communication module 420B, may be installed on the device 108 during manufacture or downloaded thereafter. As well, software modules, such as calendar module 420C, address book 420D and location module 420E.

Profile management module 420M is software and/or firmware that provides processes to receive and update profile lists for wireless connections and to allow a user to define trigger conditions for commands for a network. As noted earlier, the trigger conditions may be to initiate a connection request to the network based on conditions of another network. Additional trigger conditions may be set to terminate or initiate follow-up commands to the network.

Network connection module (NCM) 420N is software and/or firmware that provides processes to detect and analyze when device 108 is in communication contact with one or more networks 110 and determine the parameters of each communicating network 110. It may also control when to seek a connection to a particular network, using profile data as provided by profile management module 420M, to implement an algorithm similar to process 300, described earlier. When NCM 420N is used to monitor 802.11x networks and issue commands relating thereto, the monitoring of signals and the initiation of commands may follow the functional requirement of 802.11 frames as noted earlier.

Additional modules such as personal information manager (PIM) application may be provided. Any module may be installed during manufacture or downloaded thereafter into device 108.

Data associated with each application, the status of one or more networks, profiles for networks and trigger conditions for commands for networks can be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by device 108. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which device 108 is intended to operate. For example, communication sub-system 404 of device 108 may operate with the Mobitex™, DataTAC (trade-mark) or General Packet Radio Service (GPRS) mobile data communication networks and also operate with any of a variety of voice communication networks, such as 802.11 networks, Bluetooth networks, Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 108. In any event, communication sub-system 404 provides device 108 with the capability of communicating with other devices using various communication technologies, including instant messaging (IM) systems, text messaging (TM) systems and short message service (SMS) systems.

Short-range communication sub-system 406 enables communication between device 108 and other proximate systems or devices, which need not necessarily be similar devices. For example, the short-range communication sub-system may include an infrared device and associated circuits and components, a Wi-Fi or a Bluetooth™ communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430. One particular operational aspect of receiver 422 and antenna 426 is that they need to be tuned to receive signals in the 802.11 network bands, e.g. signals in the 2.4 GHz to 5.8 GHz range for sub-systems 406 and if needed, sub-system 404. Additional filters on antenna may also be used to provide such functionality. Module 420N can receive and interpret the signals and can generate its own signals for transmission to network 110.

Receiver 422, antenna 426 and network connection module (NCM) 420N provide at least some of the hardware and software elements needed to detect when device 108 is in the presence of communication signals from network 110, thereby enabling device 108 to communication with other devices in network 110.

As described earlier, NCM 420N also has system and processes that extracts any profile trigger conditions as set and managed by the profile manager and monitors for their partial and full satisfaction. Once a trigger condition is satisfied, NCM 420N may initiate the follow-up commands and controls associate with the trigger condition.

For example, if one trigger condition was to initiate a beacon signal monitor for a 802.11a network only when a 802.11b/g network is detected (as per a defined trigger stored in the profile manager), then NCM 420N operates as follows. First, NCM 420N sets controls for communication sub-systems 406 or 404 (if so implemented) of device 108 to not monitor for receipt of a beacon signal for a 802.11a network. When sub-systems 406 (or 404) detect that a 802.11b/g network beacon is received, thereafter, an evaluation process in NCM 420N would initiate a monitor for a beacon signal for a 802.11a network and would update relevant status indicators for the 802.11b/g and 802.11a networks. It will be appreciated that implementation of the noted processes and functions may be provided and distributed in one or more modules and processes operating on device 108.

Similarly, after a connection to a network is established, if there are any termination trigger conditions for the network, then NCM 420N (or another process) monitors for such conditions as defined by a network profile and if they are all satisfied, then the connection may be terminated.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 434. Upon activation of the power switch an application 420 is initiated to turn on device 108. Upon deactivation of the power switch, an application 420 is initiated to turn off device 108. Power to device 108 may also be controlled by other devices and by software applications 420.

Device 108 may also have global positioning system 436 to assist in identifying a present location of device 108 and may also have light sensor 438 to provide data on the ambient light conditions for device 108.

Although an embodiment has been described in terms of seeking and/or otherwise searching for a 802.11 network, the features of an embodiment can be provided in other network technologies. For example, when a predetermined search criteria is satisfied, another embodiment may generate an active request signal for a network connection, instead of initiating a monitoring process for a particular beacon signal.

Further still, in other embodiments, once the predetermined connection parameters are satisfied, other processes may be initiated which may or may not be related to seeking a network connection.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

The invention claimed is:

1. A method for initiating a command relating to a network for a communication device, comprising:
 initiating a command relating to said network after satisfaction of a predetermined condition relating to another network relating to said communication device,
 wherein said predetermined condition comprises at least one of the following conditions:
 a time tracked by said device;
 a present location of said device; and
 a signal strength detected by said device for said another network having a minimum predetermined strength.

2. The method for initiating a command relating to a network as claimed in claim 1, wherein:
 said network is a 802.11a network;
 said another network is a non-802.11a network;
 said predetermined condition comprises detection of a connection to said non-802.11a network; and
 said command is to initiate monitoring for a connection to said 802.11a network.

3. The method for initiating a command relating to a network as claimed in claim 2, wherein said initiating said command to said network comprises monitoring for receipt of a beacon signal from said network.

4. The method for initiating a search for a connection to a network as claimed in claim 3, wherein said non-802.11a network is selected from at least one of the following networks: a 802.11b network; a 802.11g network, a 802.11b/g network and a 802.11n network.

5. The method for initiating a search for a connection to a network as claimed in claim 1, wherein after said connection is established, said method further comprises terminating said connection after satisfaction of a second predetermined condition.

6. The method for initiating a search for a connection to a network as claimed in claim 5, wherein said second predetermined condition comprises at least one of the following conditions: an elapsed time of searching for said network; a present location of said device; and the signal strength of communications from said another network dropping below a predetermined threshold.

7. The method for initiating a command relating to a network as claimed in claim 1, wherein:
 said network is a non-802.11 network;
 said another network is a 802.11 network;
 said predetermined condition comprises detection of a connection to said 802.11 network; and
 said command is to initiate a status request signal to said network.

8. The method for initiating a command relating to a network as claimed in claim 1, wherein:
 said network is one type of 802.11 network;

said another network is another type of 802.11 network different from said one type of 802.11 network;

said predetermined condition comprises detection of a connection to said another type of 802.11 network; and said command is to initiate monitoring for a connection to said one type of 802.11 network.

9. A system for initiating a command relating to a network for a communication device, comprising:

a monitoring process for monitoring for connection signals from a plurality of networks for said device;

an evaluation process to evaluate said connection signals and determine whether a trigger condition for a command relating to a network of said plurality of networks has been satisfied; and a command process to initiate said command for said network, wherein said evaluation process causes said command process to initiate said command for said network upon detecting satisfaction of said predetermined condition from connection signals from said monitoring process, said predetermined condition comprising at least one of the following conditions:

a time tracked by said device;

a present location of said device; and a signal strength detected by said device for a connection to another network of said plurality of networks having a minimum predetermined strength.

10. The system for initiating a command relating to a network as claimed in claim 9, wherein each network of said plurality of networks are of the same type.

11. The system for initiating a command relating to a network as claimed in claim 9, wherein said plurality of networks comprises a first network of a first type and a second network of a second type.

12. The system for initiating a command relating to a network as claimed in claim 11, wherein:

said network is a 802.11a network;

said command is a request to monitor for a connection to said 802.11a network; and said predetermined condition comprises detection of a connection to a non-802.11a network by said monitoring process.

13. The system for initiating a command relating to a network as claimed in claim 12, wherein said monitoring process monitors for receipt of beacon signals from said plurality of networks.

14. The system for initiating a command relating to a network as claimed in claim 13, further comprising a GUI process providing an interface on said device to change said predetermined condition.

15. The system for initiating a command relating to a network as claimed in claim 9, wherein after said connection is established, said system monitors for a second predetermined condition and upon satisfaction of said second predetermined condition, initiates a command to terminated said connection.

16. The system for initiating a command relating to a network as claimed in claim 15, wherein said second predetermined condition comprises at least one of the following conditions: an elapsed time of searching for said network; a present location of said device; and the signal strength of communications from said another network dropping below a predetermined threshold.

17. The system for initiating a command relating to a network as claimed in claim 9, wherein:

said network is one type of 802.11 network;

said another network is another type of 802.11 network different from said one type of 802.11 network;

said predetermined condition comprises detection of a connection to said another type of 802.11 network; and said command is to initiate monitoring for a connection to said one type of 802.11 network.

18. The system for initiating a command relating to a network as claimed in claim 9, wherein:

said network is a non-802.11 network;

said another network is a 802.11 network;

said predetermined condition comprises detection of a connection to said 802.11 network; and said command is to initiate a status request signal to said network.

\* \* \* \* \*